UNITED STATES PATENT OFFICE.

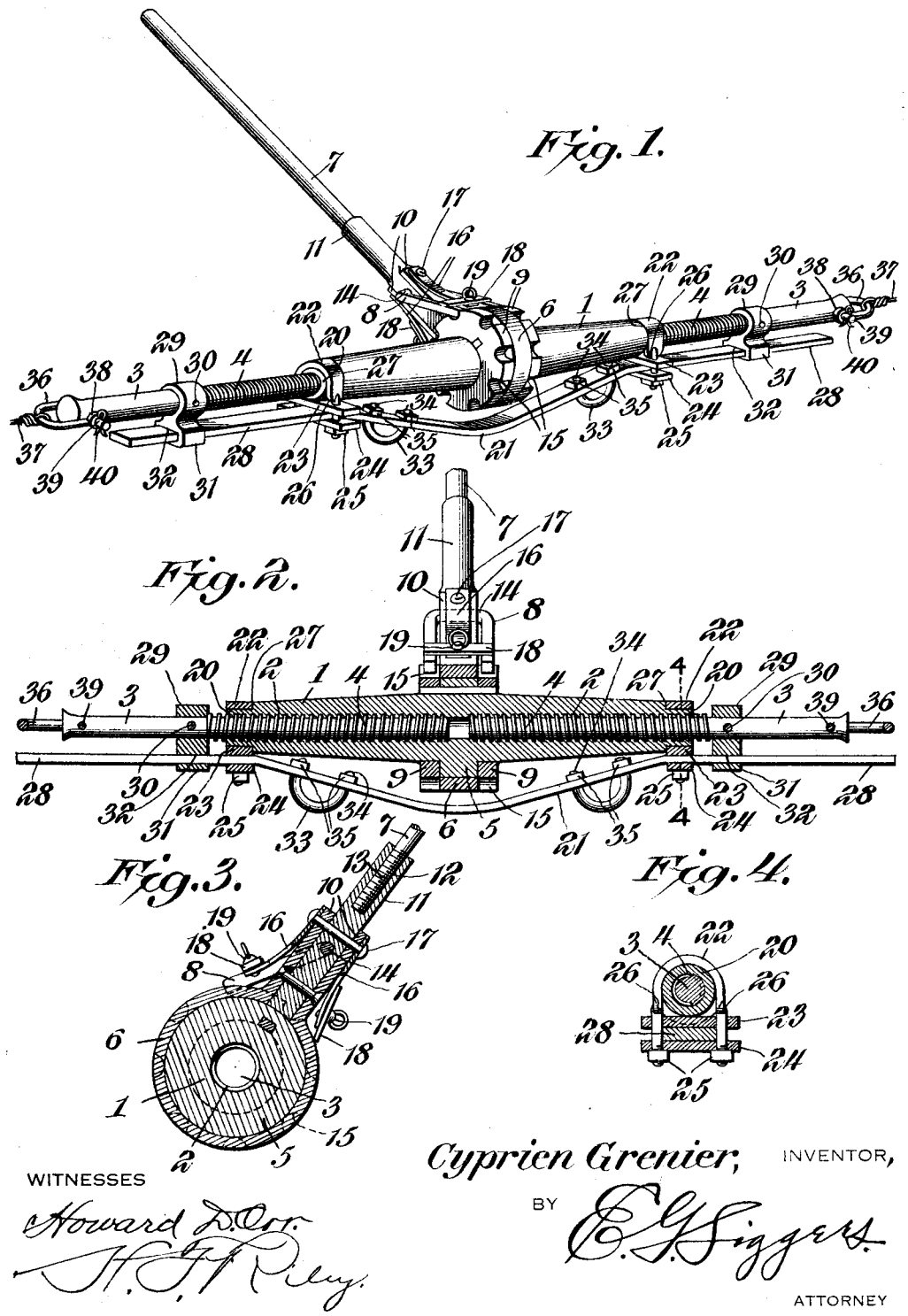

CYPRIEN GRENIER, OF COATICOOK, QUEBEC, CANADA.

STRETCHING IMPLEMENT.

1,037,615.  Specification of Letters Patent.  Patented Sept. 3, 1912.

Application filed March 12, 1912. Serial No. 683,237.

*To all whom it may concern:*

Be it known that I, CYPRIEN GRENIER, a subject of the King of Great Britain, residing at Coaticook, in the county of Stanstead and Province of Quebec, Dominion of Canada, have invented a new and useful Stretching Implement, of which the following is a specification.

The invention relates to improvements in stretching implements.

The object of the present invention is to provide a simple, efficient and comparatively inexpensive implement of great strength and durability, designed for stretching electric wires, fence wires, and for use in various other stretching and pulling operations, and capable of enabling a relatively great force to be easily exerted in stretching or pulling, and also as a jack for pushing or exerting outward pressure for various purposes.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a stretching implement constructed in accordance with this invention. Fig. 2 is a longitudinal sectional view of the same. Fig. 3 is a central transverse sectional view. Fig. 4 is a transverse sectional view on the line 4—4 of Fig. 2.

Like numerals of reference designate corresponding parts in all the figures of the drawing.

In the accompanying drawing in which is illustrated the preferred embodiment of the invention, 1 designates a rotary longitudinal sleeve constructed of suitable metal and provided with right and left hand screw threads 2, extending inwardly from the ends of the sleeve to the central portion thereof and receiving longitudinally movable rods 3, having right and left hand threaded inner portions 4 to engage the threads of the rotary sleeve 1. The rotary sleeve is provided with a central annular flange or enlargement 5, forming a bearing for a ring or band 6 of an oscillatory lever 7, carrying a reversible pawl 8 adapted to engage ratchet plates or disks 9, located at opposite sides of the annular flange or enlargement 5 and being of greater diameter than the same to form an intervening annular space or groove for the reception of the ring or band 6 of the lever 7. The terminal portions 10 of the ring or band are suitably secured to opposite faces of a shank 11 provided at its outer portion with a threaded socket 12 for the reception of the inner threaded portion 13 of the handle 7. The reversible pawl, which is approximately U-shaped, consists of two parallel engaging portions and a transverse connecting portion 14, forming a pivot and extending through a perforation of the shank 11. The engaging portions of the pawl are located at opposite sides of the shank of the lever, and they are adapted to engage peripheral notches 15 of the ratchet disks or plates 9. The reversible pawl or dog of the ratchet mechanism is maintained in engagement with the ratchet disks or members 9 by springs 16, located at the front faces of the shank 11 of the lever 7 and secured at their outer ends to the same by a rivet 17, or other suitable fastening device and provided at their inner ends, which are free, with pivotal plates 18. The plates 18 are centrally secured to the inner ends of the springs by suitable pivots 19, and they are adapted to extend across the space between the engaging portions of the pawl or dog for maintaining the same in engagement with the ratchet disks or members, and they are also adapted to be turned longitudinally of the springs to release the pawl or dog and to enable the same to be swung in advance or in rear of the operating lever, whereby the ratchet mechanism may be reversed. By this construction the longitudinal sleeve may be rotated in either direction to slide the rods 3 outwardly and to draw the same inwardly.

The ends 20 of the rotary sleeve are reduced to form journal portions, which are arranged in bearings of a supporting frame comprising a longitudinal bar or member 21, located beneath the rotary sleeve and bowed outwardly or downwardly at its intermediate portion to clear the ratchet mechanism. The longitudinal bar 21 is connected at the terminals of its intermediate bowed portion with the ends of the rotary sleeve by clips 22, embracing the reduced terminals 20 of the rotary sleeve and constituting bearings for the same. The clips are equipped at their terminal portions with clip plates 23 and 24, spaced apart to receive the longitudinal bar 21 and clamping the upper and lower faces thereof. The terminals of the sides of the clip are threaded for the reception of nuts 25, which bear against the lower face of the plate 24. The upper plate 23 fits against shoulders 26, forming stops for maintaining the upper clip plate in spaced relation with the curved top portion of the clips to relieve the terminal portions of the rotary sleeve of pressure. The clips are firmly clamped on the longitudinal bar of the frame or support, and they fit against the shoulders 27 formed by the reduction of the sleeve 1, which is adapted to rotate in the bearings of the frame or support, formed by the longitudinal bar and the clips.

The terminal portions 28 of the longitudinal bar are straight and are arranged in parallelism with the rods 3 to form guides for slides 29, preferably consisting of collars secured by transverse pins 30, or other suitable fastening devices on the rods 3 and having enlarged portions 31, provided with slots 32 through which the straight guiding portions 28 of the bar 21 pass. The pins 30 pierce the collars and the rods 3 beyond the threaded portions thereof, and the slidable connection between the collars and the support for the rotary sleeve prevents the screws from turning in their bearings and twisting the wire, chain, rope, or other part with which they are connected. The slots 32 are oblong or rectangular to fit the straight guiding portions 28. The intermediate bowed portion of the longitudinal rod is also provided with projecting loops 33 of approximately semi-circular form, having reduced threaded terminals 34 piercing the rod 21 and provided with nuts 35, which rigidly secure the loops to the bar 21. The projecting loops are adapted to receive a bar or similar object for preventing the frame or support from turning with the rotary sleeve when the latter is operated.

The outer portions of the slidable rods are smooth and are equipped with pivoted loops 36, adapted to have the ends of wires connected with them, as illustrated in Fig. 1 of the drawing, or by any suitable means. The loops 36, which are approximately U-shaped, have terminal eyes 38, located at opposite sides of the rods and connected with the same by transverse pins 39, secured in place by cotter pins or keys 40, or other suitable means. The loops or links may be connected with fence wires, telegraph, or other wires for stretching the same, or with a rope, chain, cable, or the like for pulling the same for any desired purpose, and the terminal loops or links are adapted to be swung out of the way for enabling the implement to be used analogous to a jack for various pushing operations. The longitudinal sleeve for actuating the slidable screws is continuously rotated by oscillating the operating lever in the direction of the rotation of the sleeve, and the consequent movement of the slidable rods may be reversed or changed by reversing the pawl of the ratchet mechanism.

No claim is made in the present application to the construction of the ratchet mechanism.

What is claimed is:—

1. An implement of the class described including a rotary sleeve having right and left hand screw threads, slidable rods provided with right and left hand threaded portions engaging the threads of the sleeve, ratchet mechanism for rotating the sleeve, and a support having bearings for the rotary sleeve and provided with guiding means having a slidable connection with the rods for holding the same against rotary movement.

2. An implement of the class described including a support provided with bearings and having terminal longitudinal guides, a rotary sleeve mounted in the bearings of the support and having right and left hand screw threads, rods provided with right and left hand threads engaging the threads of the sleeve, means for slidably connecting the rods with the longitudinal guides, and means for rotating the sleeve.

3. An implement of the class described including a support provided with bearings and having terminal longitudinal guides, a rotary sleeve mounted in the bearings of the support and having right and left hand screw threads, rods provided with right and left hand threads engaging the threads of the sleeve, collars secured to the rods and provided with openings through which the longitudinal guides pass for holding the rods against rotary movement, and means for rotating the longitudinal sleeve.

4. An implement of the class described including a rotary sleeve having right and left hand screw threads, a support for the sleeve extending longitudinally thereof and provided at spaced points with bearings located intermediate of the ends of the support and receiving the rotary sleeve, said support being also provided with straight outer guiding portions, rods having right and left hand threads engaging those of the sleeve, slides secured to the rods and receiving the guides and movable along the same and adapted to hold the rods against rotary movement, and means for rotating the sleeve.

5. An implement of the class described including a rotary longitudinal sleeve having right and left hand screw threads, a support extending longitudinally of the sleeve and provided with spaced bearings for the same and having straight guiding portions located beyond the bearings, rods having right and left hand threaded portions to engage the threads of the sleeve, means carried by the rods and slidable along the guides for holding the rods against rotary movement, and a loop mounted on and projecting from the support and adapted to receive a bar for preventing the support from turning.

6. An implement of the class described including a longitudinal sleeve having right and left hand screw threads, a longitudinal bar having straight terminal guiding portions, clips receiving and forming bearings for the sleeve and provided with clip plates arranged in pairs and clamping the bar to rigidly secure the clips to the same, rods having right and left hand threaded portions to engage the threads of the sleeve, and slides fixed to the rods and movable along the guiding portions of the bar.

In testimony, that I claim the foregoing as my own, I have hereto affixed my signature in the presence of two witnesses.

CYPRIEN GRENIER.

Witnesses:
OMER BIHALE,
ALEXINA JONCAS.